Oct. 28, 1958

E. K. HOWELL 2,858,436

AUTOMATIC FREQUENCY CONTROL SYSTEM

Filed Dec. 14, 1953

2 Sheets-Sheet 1

Inventor:
Edward Keith Howell,
by Donald M. Timbie
His Attorney.

Oct. 28, 1958

E. K. HOWELL 2,858,436

AUTOMATIC FREQUENCY CONTROL SYSTEM

Filed Dec. 14, 1953

2 Sheets-Sheet 2

Inventor:
Edward Keith Howell,
by Donald N. Timlie
His Attorney.

United States Patent Office 2,858,436

Patented Oct. 28, 1958

2,858,436

AUTOMATIC FREQUENCY CONTROL SYSTEM

Edward Keith Howell, North Syracuse, N. Y., assignor to General Electric Company, a corporation of New York Application December 14, 1953, Serial No. 398,054

4 Claims. (Cl. 250—36)

This invention relates to an automatic frequency control system of the type that may be used to synchronize the line scanning operation of a television receiver with the line frequency synchronizing pulses.

It is the object of this invention to provide an improved automatic frequency control circuit having sufficient pull-in range to obviate the necessity of making a manual line scanning frequency control generally termed the "horizontal hold control" available to the user of the receiver.

Previous systems have been comprised of an oscillator adjusted to run at approximately the line scanning frequency, a phase discriminator that derives an error voltage indicative of the average relative phase and frequency of the oscillator and the synchronizing pulses, and means such as a reactance tube for controlling the phase of the oscillator in accordance with the error voltage. In most discriminators it is required that the sine wave supplied by the oscillator pass through its axis during the line synchronizing pulses. For this purpose, a phase shifting network has generally been interposed between the oscillator output and the discriminator.

It has been demonstrated that the pull-in range of an automatic frequency control system is proportional, for a given bandwidth, to the gain of the loop formed by the oscillator, discriminator and the reactance tube. Hence, if the loop gain is not sufficient, a manual control is essential. Because the phase of the oscillator must, in previous systems, be shifted by a considerable amount, the phase shifter usually introduces considerable attenuation of the reference signal applied to the discriminator, thereby effectively reducing the loop gain and the effective pull-in range of the system. Furthermore, phase shifting circuits of practicable use are generally expensive.

Therefore, it is an object of this invention to provide an improved automatic frequency control system in which the phase shift circuit reduces the loop gain by a minimum amount.

It is another object of the invention to provide an improved automatic frequency control circuit wherein the phase shift network may be relatively inexpensive.

Briefly, these objects may be realized by using a class C oscillator having a 180° conduction angle. In order to make a further increase in the loop gain, the reactance tube is coupled to the oscillator in such manner that the reactance tube appears as substantially a pure reactance.

The manner in which the above objectives, as well as other advantages of this invention, may achieved will be better understood after the following detailed consideration of the drawings in which.

Figure 1:
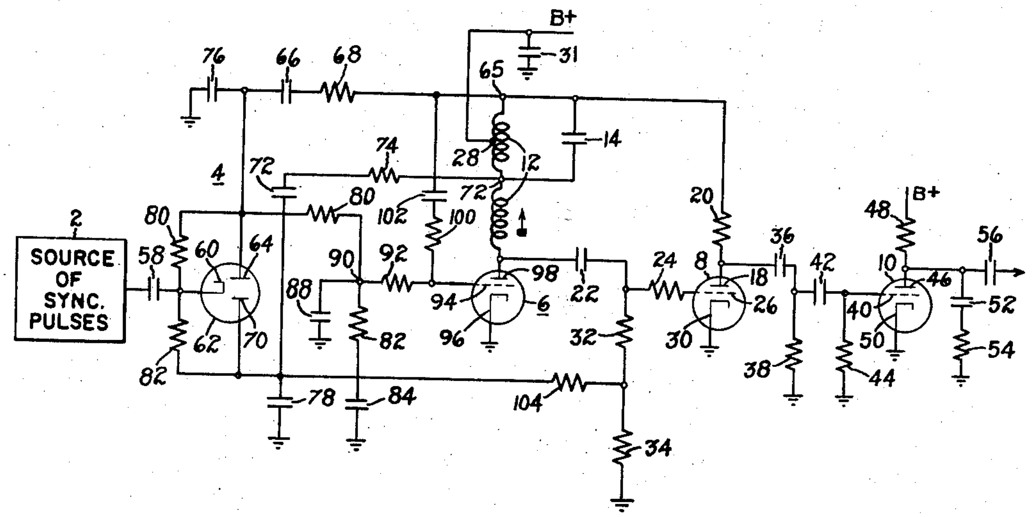
Figure 1 is a schematic diagram of an automatic frequency control system embodying the principles of the invention.
Figure 2:
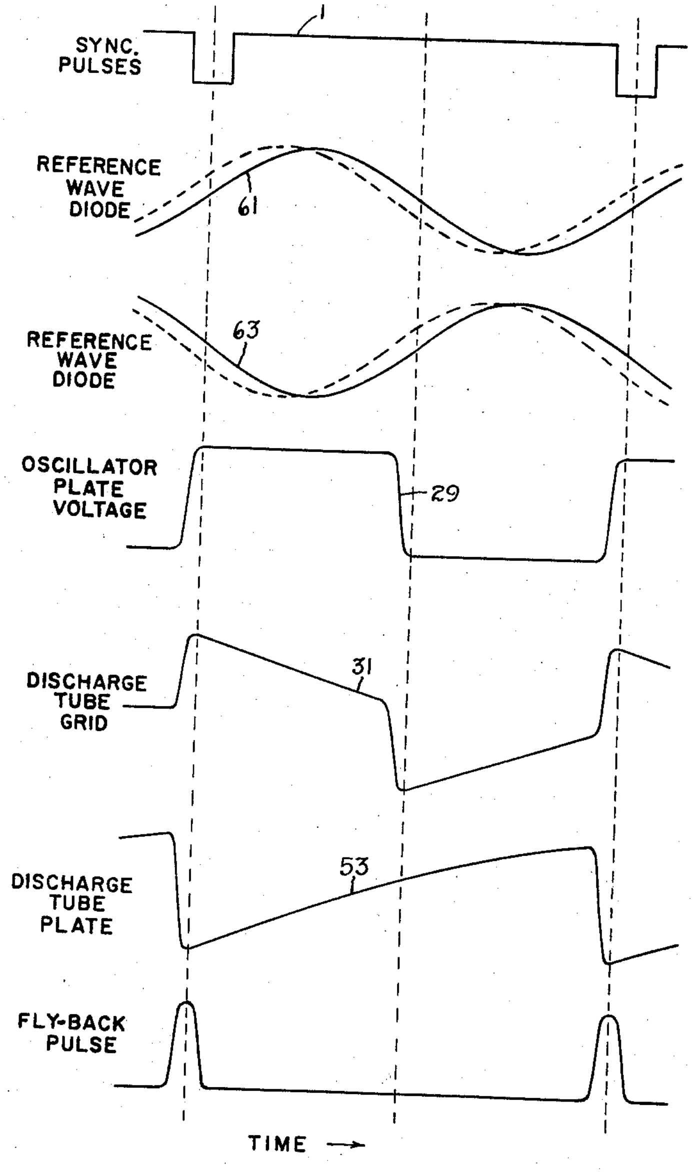
Figure 2 are waveforms, drawn to a common time scale, occurring at various points in the system of Figure 1 and useful in explaining the operation thereof.

The specific embodiment of this invention illustrated in Figure 1 is comprised of a source 2 of negative synchronizing pulses such as shown at 1 in Figure 2, a phase discriminator 4, a reactance tube 6, an oscillator tube 8 and a discharge tube 10. The oscillator tube 8 is here shown as being connected in a modified Hartley oscillator circuit, but it will be apparent to those skilled in the art that other oscillator circuits could be adapted for use in the invented combination.

In this particular arrangement, one end of a resonant circuit, comprised of a tightly-coupled variable inductance 12 and a capacitor 14, is coupled to the place 18 of the oscillator tube 8 via a resistor 20. The other end of the resonant circuit is coupled by a capacitor 22 and a grid current limiting resistor 24 to the grid 26 of the oscillator tube 8. An intermediate point 28 of the inductance 12 is connected to a source of positive potential that is bypassed for alternating current by a condenser 31. The cathode 30 of the tube 8 is connected to ground as shown.

The resistor 24 and resistors 32 and 34 form a grid leak for the grid 26. It will be noted that the point 28 is nearer the plate 18 than it is to the grid 26. This causes the sine wave applied to the grid 26 to have sufficient amplitude during positive half-cycles to drive the grid into the region of grid current conduction and plate saturation. During the negative half-cycles the wave applied to the grid has sufficient amplitude to drive the grid beyond cut-off. The time constant of the capacitor 22 and the resistor 24 determines the amount of charge accumulated on the capacitor 22 during the positive half-cycles when grid current is drawn, and the time constant of the same capacitor 22 and the resistors 32 and 34 determine the amount of discharge of this condenser during the negative half-cycles. If these time constants are in the correct proportionate ratio, the average self-bias established at the grid 26 of the oscillator tube 8 is sufficient to place the operating point of this tube at the central point of the plate current vs. grid voltage characteristic. Consequently, the plate current goes to a maximum or saturation value at a given amplitude of the positive half-cycle of the sine wave applied to the grid and at the same amplitude of the negative half-cycle it goes to zero. Hence, the current through the oscillator tube 8 is in the form of a symmetrical square wave and produces a corresponding square wave of voltage, such as shown at 29 in Figure 2, at the plate thereof. The voltage is developed across the plate load resistor 20. Actually it is combined with the sine wave of voltage applied to the plate from the upper end of the inductance 12 of the tank circuit but the amplitude of the sine wave is so small in comparison with the amplitude of the square wave as to be negligible.

This square wave output of the oscillator tube 8 is differentiated by a condenser 36 and a resistor 38 so as to provide a wave such as shown at 31 of Figure 2 at the grid 40 of the discharge tube 10. This differentiated wave appearing across the resistor 38 is coupled to the grid 40 by a condenser 42 and a resistor 44. During a small part of the positive peaks of the wave, the grid 40 draws current and charges the condenser 42. During the remainder of the wave, the discharge of the condenser 42 cuts off the flow of current in the discharge tube 10. The plate 46 of the discharge tube 10 is connected to a point of B+ voltage by a resistor 48 and the cathode 50 is grounded. A condenser 52 and a resistor 54 are connected in series-parallel relationship with the discharge tube 10. When the tube 10 is conducting, it discharges the condenser 52, and when it is not conducting, the condenser 52 charges towards B+, so as to produce the sawtooth wave shown at 53 of Figure 2. This sawtooth wave is coupled to the deflection circuits (not shown) via a condenser 56.

The phase of the oscillator 8, and hence the phase of the scanning operation controlled by the oscillator is synchronized with the negative synchronizing pulses 1 of Figure 2 supplied by the source 2 in the following manner. These pulses are coupled by a capacitor 58 to a common cathode 60 of a duo-diode tube 62. One plate 64 of the duo-diode tube is coupled to one end 65 of the inductance 12 in the tank circuit of the oscillator via a condenser 66 and a resistor 68 and the other plate 70 of the duo-diode tube 62 is coupled to a point 72 on the inductance 12 via a capacitor 72 and a resistor 74. The points 65 and 72 are equally displaced from the point 28 of the inductance so that sine waves of equal amplitude and opposite phase are applied to the plates 64 and 70 as indicated by the waves 61 and 63 of Figure 2. The plates 64 and 70 are respectively coupled to ground via capacitors 76 and 78 and to the common cathode via the respective resistors 80 and 82.

The capacitors 66 and 72 and the resistors 68 and 74 serve to retard the phase of the sine waves derived from the inductance 12 so that their phase is shifted from the dotted position shown in Figure 2 to the solid line position. The reason for this shift in phase is as follows: The square wave at the plate 18 of the oscillator tube 8 crosses its *a—c* axis at the same time as the dotted sine waves of Figure 2 representing the oscillations in the tank circuits of the oscillator. The electron beam generally starts its retrace at the time these waves go through their zero axis. If the sine waves were applied directly from the oscillator resonant circuit to the discriminator, the oscillator phase would be controlled in such manner that the sine waves in its resonant circuit would pass through zero at the center of the synchronizing pulses. For various reasons the time for retrace in some receiver deflection systems is longer than the time difference between the center of the synchronizing pulses and the end of the blanking pedestal. This means that the beam is not quite back to its starting point when it is unblanked and modulated with video signals and what is known as "fold over" occurs. When the sine waves actually occurring in the resonant circuit as represented by the dotted lines of Figure 2, are retarded to the phase represented by the solid line, the discriminator is balanced at a point where the center of the synchronizing pulses coincides with the point at which the waves represented by the solid line crosses the zero axis. However, the start of retrace occurs earlier at the point where the dotted lines cross the zero axis. In this way retrace can be made to commence at the beginning of the horizontal blanking period if necessary. However, if the design of the scanning and high voltage power supply system is such that retrace takes place within the time between the center of the synchronizing pulses and the end of the blanking interval, there would be no need to advance the phase of the reference waves applied to the discriminator in the circuit of this invention.

However, as the conduction angle of the oscillator tube 8 becomes less than 180°, as in previous circuits, it is necessary to provide more and more phase advance. In fact it may be necessary to provide considerable phase advance to make the retrace interval occur during blanking. Tuned transformers can be used to bring about this relatively large amount of phase shift and not reduce the gain of the A. F. C. loop. However, such transformers are expensive and if, for some reason, the frequency of the synchronizing pulses varies, the amount of phase shift provided by the transformer varies.

In the circuit of this invention, the maximum amount of phase shift required is so small that an RC network can be used. If the phase shift were large, as in the case of oscillators that conduct less than 180°, the RC network would reduce the gain below the minimum required.

The coupling arrangement between the phase discriminator and the oscillator also operates to prevent the oscillator from being directly synchronized by the synchronizing pulses. If this occurs, the advantages of an A. F. C. system are lost as the system is highly susceptible to noise. In the particular coupling arrangement shown, the capacitors 76 and 78 have small impedance for the frequency of the synchronizing pulses so that these frequencies are effectively bypassed around the portion of the inductance 12 that are effectively in parallel with the capacitors. The small amount of voltage thus introduced into these parallel arrangements is further attenuated by the resistors 68 and 74 so that very little, if any, voltage is left for the inductance 12. Furthermore, the capacitor 14 is connected between the points 72 and 65 from which reference waves are taken and to which sync pulse energy might flow. In a manner well known to those skilled in the art the resonant circuit formed by the inductance 12 and the capacitor 14 may be made to resonate at the line scanning frequency and have the impedance of the capacitor 14 present a low impedance to this frequency. Accordingly, the capacitor 14 may be made to bypass this frequency around the portion of the inductance 12 between the points 72 and 65. If the capacitor 14 were connected in parallel with the entire inductance 12, it can be seen that the sync pulse frequencies fed to the resonant circuit at the point 72 would have to flow through part of the inductance 12 before reaching the capacitor 14 and that sync pulse energies would be present in the tank circuit. This, of course, would tend to cause the oscillator to synchronize to the sync pulses directly instead of to the output of the discriminator 4. The point 28 of the inductance is not at the middle of the inductance so as to produce, for reasons previously set forth, sine waves of greater amplitude at the grid 26 of the oscillator tube 8. However, the points 65 and 72 to which the discriminator 4 is coupled by the network described above must, if the discriminator is to be balanced, be symmetrically located with respect to the point 28.

Although the general operation of phase discrimination of the type illustrated is generally known to those skilled in the art, it will now be briefly reviewed for the purpose of convenience. If the synchronizing pulse occurs at the point where the reference sine waves applied to the plates 64 and 70 cross their zero axis, then each of the diodes conducts an equal amount and equal charges are built up on the condensers 76 and 78. However, if the synchronizing pulses shift from this position, one of the diodes conducts more than the other and the potential at the plate 64 of the duo-diode tube 62 shifts in a positive or negative direction. If the shift is such that the synchronizing pulse occurs when the plate 64 is positive, more current flows to this plate than to the other plate 70. Consequently, the charge on the capacitor 76 becomes more negative and the charge on the condenser 78 is reduced as the respective diodes and capacitors act like peak detectors. The combined effect of the voltage charges thus produced across the capacitors 76 and 78 results in the voltage at the plate 64 becoming more positive. If the synchronizing pulse occurs when reference sine waves make the plate 64 more negative than the plate 70 the reverse action takes place and the plate 64 becomes more negative.

The output of the discriminator 4 is coupled to the reactance tube 6 in the following manner. The variations in potential at the plate 64 are applied to a network comprised of resistors 80, 82 and a capacitor 84 that operates to control the bandwidth and transient response of the A. F. C. loop. The frequencies upon which this network operates are the beat frequencies between the sync pulses and the reference waves applied to the discriminator and represent the useful output of the discriminator. A capacitor 88 is connected between the junction 90 of the resistors 80 and 82 and ground. It is of such size as to have low impedance compared to that of the resistor 82 and the capacitor 84 for frequencies in the order of the synchronizing pulse repetition rate, and a much higher value of impedance for the maximum beat frequency involved, normally between 500 and 700 cycles. Hence, the capacitor 88 prevents any of the synchronizing pulse frequencies or oscillator frequencies appearing in the output of the discriminator from affecting the reactance tube 6. A resistor 92 is connected between the junction 90 and the grid 94 of the reactance tube 6 for reasons to be given later.

The reactance tube 6 is connected in the following manner. The cathode 96 of the reactance tube is connected to ground, and the plate 98 is connected to one end of the inductance 12. Hence the reactance tube is effectively in parallel with that portion of the inductance 12 lying below the ground point 28. It has been customary to connect the plate of a reactance tube to one end of a tank circuit of an oscillator and to couple the plate of the tube to the grid by a network that shifts the phase of the voltage applied to the grid. In order that the tube represent a pure reactance, the voltage applied to the grid should be shifted by more than 90° with respect to the voltage applied between the plate and the cathode. This is required because of the plate resistance of the tube. Unless tuned resonant circuits are used in the network between the plate and grid of the tube, it is impossible to shift the phase by more than 90°. In accordance with this invention, however, the grid of the reactance tube is not coupled to the plate but to a point on the resonant circuit at which the voltage waves are 180° out of phase with the voltage waves applied to the plate. The coupling network between this point and the grid is such as to shift the phase until a component of current produced in the reactance tube balances out the inphase component drawn by the plate. In this particular case, the grid 94 of the reactance tube 6 is coupled to the point 65, via a resistor 100 and a capacitor 102. The point 65 is on the opposite side of the ground point 28 from the end of the inductance 12 to which the plate 98 is connected and accordingly the voltage at the point 65 and the plate 98 are 180° out of phase. The capacitor 102 and the resistors 100 and 92 shift the phase the desired amount and reduce the amplitude to the required level.

Figure 3:
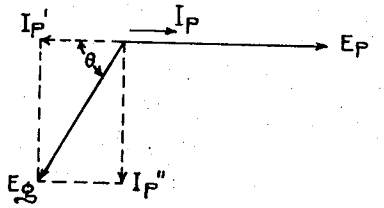
Figure 3 is a vector diagram useful in explaining the operation of the reactance tube-oscillator combination in Figure 1.

Assume that as shown in Figure 3, the voltage applied to the plate 98 is $E_p$ and that the in phase current flowing as a result of this voltage is $I_p$. The current $I_p$ is determined by the plate resistance of the tube. As stated above, the voltage at the point 65 is 180° out of phase with $E_p$. If this voltage is advanced in phase by an angle $\theta$ the voltage applied to the grid 94 is $E_g$. This voltage acting alone would cause a current of similar phase to flow. This current can be analyzed into a component $I_p'$ which cancels the current $I_p$, and a component $I_p''$ which is in phase quadrature with respect to the plate voltage $E_p$. Hence the tube 6 offers a pure reactance.

Biasing for the reactance tube 6 is preferably such as to maintain it at the middle of its operating range. In the particular arrangement shown, the bias may be obtained at the junction of the resistors 32 and 34 that form the grid leak for the oscillator tube 8. This voltage is added to the discriminator output voltage by connecting a resistor 104 between the junction and the plate 70 of the duo diodes 62.

While I have illustrated a particular embodiment of my invention, it will of course be understood that I do not wish to be limited thereto since various modifications both in the circuit arrangement and in the instrumentalities may be made, and I contemplate by the appended claims to cover any such modifications as fall within the true spirit and scope of the invention.

What I claim as new and desire to secure by Letters Patent of the United States:

1. An oscillator for producing rectangular waves comprising in combination an electron discharge device having a plate, a grid and a cathode, a parallel resonant circuit, means for grounding an intermediate point of said parallel resonant circuit for alternating current, a resistor connected between one end of said parallel resonant circuit and said plate, a capacitor and a resistor connected in the order named between the other end of said parallel resonant circuit and said grid, a grid leak resistance connected between the junction of said capacitor and said latter resistor and ground, the ratio of said resistor and said grid lead resistor being such to bias said grid with respect to said cathode in such manner that the operating point of the electron discharge device is at the central point of the plate current versus grid voltaged characteristic, and means for grounding said cathode.

2. Apparatus for providing a square wave output in synchronism with a series of synchronizing pulses of a predetermined repetition frequency comprising in combination an oscillator having an amplifier, said amplifier having at least a plate, a grid and a cathode, a parallel resonant circuit including an inductor, means for grounding an intermediate point of said circuit, a load resistor connected between one side of said resonant circuit and said plate, a capacitor and a resistor connected in the order named between the other side of said resonant circuit and said grid, and a grid leak resistor connected between the junction of said capacitor and said resistor and ground, means for grounding said cathode, said resistor, grid leak resistor and capacitor being so proportioned as to cause said amplifier to conduct only during each half cycle of oscillation, a reactance tube having at least a plate, a grid and a cathode, means for coupling said plate of said reactance tube to one side of said resonant circuit, means for grounding said cathode of said reactance tube, a phase shifting network coupled between the other side of said resonant circuit and said grid, a phase comparison device, means for coupling energy from said resonant circuit to said phase comparison device, means for coupling said synchronizing pulses when present to said phase comparison device, means for coupling the output of said phase comparison device to said grid of said reactance tube so as to control the amount of conduction therein, and an output lead connected to said plate of said amplifier.

3. In an automatic frequency control circuit for controlling the frequency of an oscillator by a series of synchronizing pulses comprising, in combination, an oscillator having a sine wave output of a frequency that is approximately the same as that of the synchronizing pulses, said oscillator having a resonant circuit and an electron discharge device, said electron discharge device having at least an anode, a grid electrode, and a cathode, means for coupling a first terminal of said resonant circuit to said anode, means coupled between the second terminal of said resonant circuit and said grid electrode for rendering said electron discharge device conductive for substantially half of a period of the sine waves produced by said oscillator, a phase detector adapted to provide an output voltage indicative of the difference in phase of waves applied thereto, means for applying the synchronizing pulses to said phase detector, means for applying the sine waves provide by said oscillator to said phase detector, a reactance tube for controlling the frequency of oscillation of said oscillator in accordance with the output voltage of said phase detector, said reactance tube having an anode, a control grid and a cathode, a phase shifting network coupled between the first terminal of said resonant circuit and the control grid of said reactance tube, means for connecting the anode of said reactance tube to the second terminal of said resonant circuit, and means for coupling the output voltage of said phase detector to the control grid of said reactance tube.

4. In an automatic frequency control circuit comprising, in combination, an oscillator having an electron discharge device, said electron discharge device having a plate, a grid and a cathode, a parallel resonant circuit, means for grounding an intermediate point on said parallel resonant circuit, a resistor connected between a first terminal of said parallel resonant circuit and said plate, means coupled between the second terminal of said parallel resonant circuit and said grid for rendering said electron discharge device conductive for substantially 180° of an operating cycle, a reactance tube for controlling the frequency of oscillation of said oscillator depending on the magnitude of a signal applied thereto, said reactance tube having a plate, a grid and cathode, a phase shifting network coupled between the first terminal of said parallel resonant circuit and the grid of said reactance tube, and means for connecting the plate of said reactance tube to the second terminal of said parallel resonant circuit.

References Cited in the file of this patent

UNITED STATES PATENTS

| | | |
|---|---|---|
| 2,098,051 | Lord | Nov. 2, 1937 |
| 2,274,648 | Bach | Mar. 3, 1942 |
| 2,363,918 | Wilcox | Nov. 28, 1944 |
| 2,469,194 | Delvaux | May 3, 1949 |
| 2,490,500 | Young | Dec. 6, 1949 |
| 2,534,155 | Wintle | Dec. 12, 1950 |
| 2,540,167 | Houghton | Feb. 6, 1951 |
| 2,540,820 | Gruen | Feb. 6, 1951 |
| 2,551,308 | Adler | May 1, 1951 |
| 2,566,762 | English | Sept. 4, 1951 |
| 2,582,673 | Boelens | Jan. 15, 1952 |
| 2,588,921 | Gruen | Mar. 11, 1952 |
| 2,598,370 | Gruen | May 27, 1952 |
| 2,610,298 | Zaloudek | Sept. 9, 1952 |
| 2,650,358 | Crane | Aug. 25, 1953 |

OTHER REFERENCES

"Modern Television Receivers," by Kiver, in Radio and Television News, January 1950, pages 45–47, 128 and 130.